US008485825B2

(12) United States Patent
Walker

(10) Patent No.: US 8,485,825 B2
(45) Date of Patent: Jul. 16, 2013

(54) FORCIBLE ENTRY TRAINING DEVICE

(75) Inventor: Craig A. Walker, Georgetown, TX (US)

(73) Assignee: The Inforcer, LLC, Austin, TX (US)

( * ) Notice: Subject to any disclaimer, the term of this patent is extended or adjusted under 35 U.S.C. 154(b) by 1180 days.

(21) Appl. No.: 12/390,622

(22) Filed: Feb. 23, 2009

(65) Prior Publication Data
US 2009/0215014 A1 Aug. 27, 2009

Related U.S. Application Data

(60) Provisional application No. 61/030,852, filed on Feb. 22, 2008.

(51) Int. Cl.
G09B 19/00 (2006.01)
(52) U.S. Cl.
USPC .......................................................... 434/226
(58) Field of Classification Search
USPC .......................................................... 434/226
See application file for complete search history.

(56) References Cited

U.S. PATENT DOCUMENTS

| 4,015,382 | A | * | 4/1977 | Noyes | 52/211 |
| 4,350,032 | A | * | 9/1982 | Kochackis | 70/427 |
| 4,376,353 | A | * | 3/1983 | Helfman | 49/504 |
| 5,906,493 | A | * | 5/1999 | Bishop | 434/226 |
| 7,972,139 | B2 | * | 7/2011 | Staub | 434/226 |
| 8,167,621 | B2 | * | 5/2012 | Allen | 434/226 |
| 8,197,257 | B2 | * | 6/2012 | Clewis | 434/226 |
| 2005/0050816 | A1 | * | 3/2005 | Manning et al. | 52/213 |
| 2008/0014564 | A1 | * | 1/2008 | Allen | 434/226 |
| 2010/0304344 | A1 | * | 12/2010 | Walker | 434/226 |
| 2011/0223569 | A1 | * | 9/2011 | Perrone | 434/219 |

* cited by examiner

Primary Examiner — Kurt Fernstrom
Assistant Examiner — Dolores Collins
(74) Attorney, Agent, or Firm — Law Offices of Mark L. Berrier

(57) ABSTRACT

Systems and methods for providing realistic simulation of forcible entry techniques using replaceable components that are designed to be deformed and/or destroyed during use. One embodiment includes a simulator having a door frame, a door pivotally mounted on the door frame, and at least one training station sub-unit that is mounted on either the door or the frame. The training station sub-unit includes at least one component that is designed to be destroyed and replaced (sometimes known as a "consumable" component). The consumable component is destroyed during use of the training station in order to produce a realistic training experience for the trainee using the station. The training station may be a door edge insert sub-unit that holds a consumable metal insert at an edge of the door proximal to the door latch, where the metal insert is deformed upon forcibly prying the door open.

18 Claims, 8 Drawing Sheets

US 8,485,825 B2

FORCIBLE ENTRY TRAINING DEVICE

CROSS-REFERENCE TO RELATED APPLICATIONS

This application claims the benefit of U.S. Provisional Patent Application 61/030,852, filed Feb. 22, 2008, which is incorporated by reference as if set forth herein in its entirety.

BRIEF DESCRIPTION OF THE DRAWINGS

Other objects and advantages of the invention may become apparent upon reading the following detailed description and upon reference to the accompanying drawings.

Figure 1:
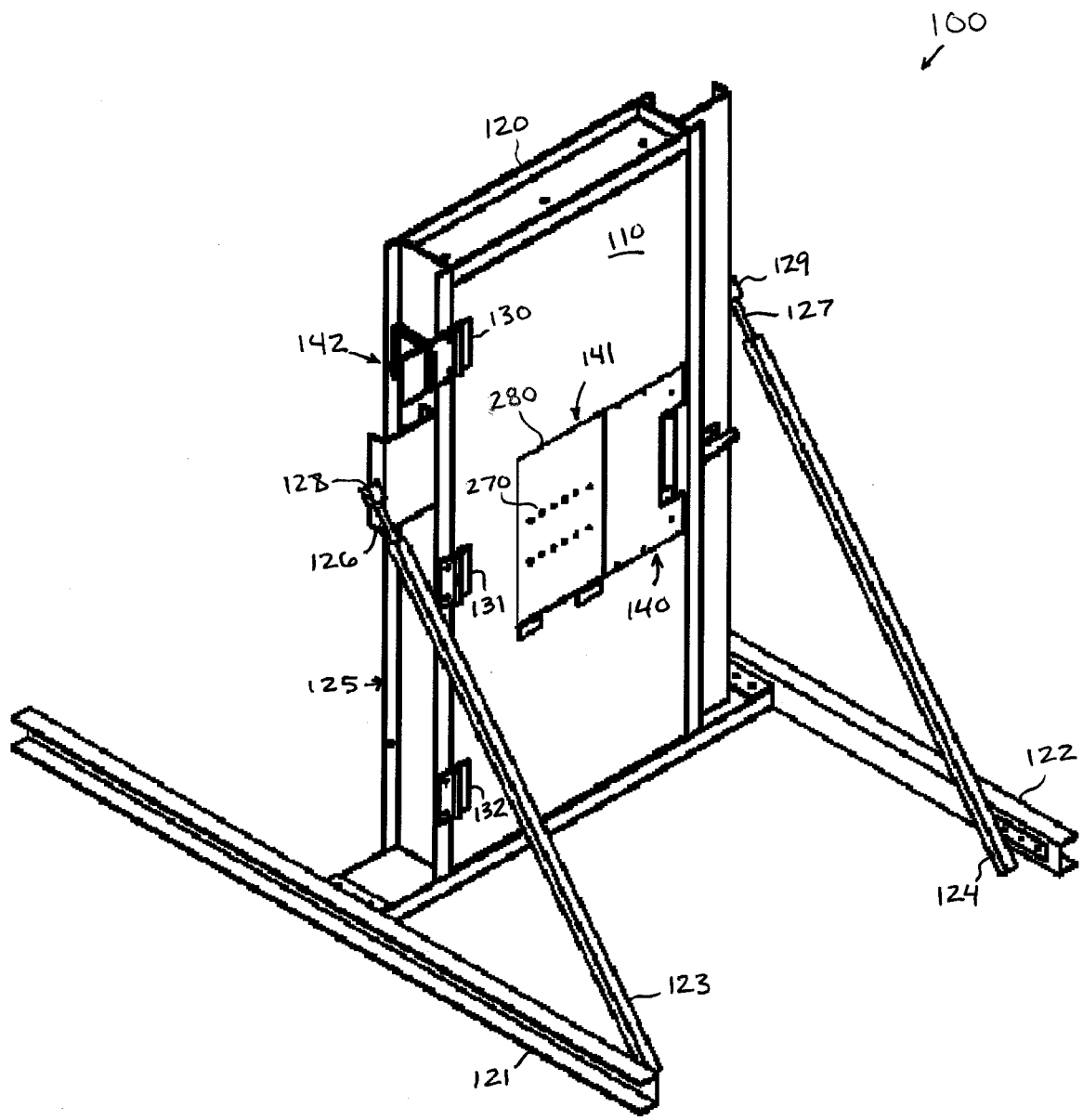
FIG. 1 is a diagram illustrating perspective view of a forcible entry simulator in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DESCRIPTION OF EXEMPLARY EMBODIMENTS

One or more embodiments of the invention are described below. It should be noted that these and any other embodiments described below are exemplary and are intended to be illustrative of the invention rather than limiting.

In order for firefighters to be able to effectively fight fires, they must be trained. A firefighter must be taught not only the techniques for actually putting out fires, but also techniques relating to their other responsibilities, such as gaining entry to structures and conducting rescue operations. One of the many important skills that must be learned by a firefighter is how to forcibly enter a building in order to gain access to the building. This may be necessary rescue persons that are trapped in the building, or to gain access to locations in the building that allow a fire to the more effectively controlled or extinguished.

Some of the techniques that must be learned by firefighters therefore involve achieving forcible entry through a locked door. Typically, a firefighting tool known as a Halligan is wedged between the door and door jamb and then used to pry the door open. While it may be relatively easy to break through a wooden residential door, it may be much more difficult to get through a locked commercial door, which may have much sturdier metal construction, and may use heavier locks, or even drop-bars to prevent the door from being opened. It is therefore necessary to learn the most effective techniques for prying doors open with the Halligan, as well as techniques for breaking or cutting locks (e.g., deadbolts or padlocks), cutting through the bolts that secure drop-bars, cutting through the hinges of the doors, etc.

Obviously, these techniques are very destructive in practice. Because the damage to the doors is typically minimal in comparison to the fire damage that would otherwise result, and is certainly negligible in comparison to the potential injury or loss of life resulting from a fire, this is not a concern when firefighters encounter a locked door in a building that is on fire. When a firefighter is undergoing training, however, the destruction of a door (particularly a heavy commercial door of the type that requires training) presents an expense that appears much more substantial because it is not overshadowed by a potentially huge loss of life or property.

Conventionally, and firefighters had learned forcible entry techniques by finding suitable doors that could be destroyed, and then practicing the techniques on the doors. Once one of the techniques had been practiced on a door, it could be difficult, or even impossible, to repair the door to the degree necessary to make it suitable for another firefighter to practice one of the forcible entry techniques on the door. Because of the limited availability these doors and the expense of obtaining them for training purposes, it became desirable to find alternative means for practicing forcible entry techniques.

One response to this need was the development of a training device as shown in U.S. Pat. No. 5,906,493 to Bishop. The device disclosed in this patent includes a sliding box that is mounted on a door in place of the door's latch mechanism. A spring is provided to bias the sliding box toward the strike plate on the door jamb on which the door is mounted. Thus, the spring pushes the sliding box toward the strike plate. The firefighter trains using this device by inserting the Halligan between the sliding box and the strike plate (in the same way it would be inserted between a typical door and the corresponding door jamb), and then prying the door open. Instead of breaking or deforming the door when it is pried open, the Halligan simply pushes the sliding box away from the strike plate, simulating the breaking or deformation of the door. The sliding box, however, is simply pushed back out after the door is pried open so that it can be used again.

Another tool that has been developed is disclosed in U.S. Patent Application Pub. No. 2008/0014564 to Allen. This patent application discloses a door that is mounted in a frame. The door has a deadbolt that extends toward the frame, and the frame includes a mechanism that can be tightened against the deadbolt so that the door is difficult to open. When the mechanism is tightened against the deadbolt, a firefighter can use a Halligan to pry open the door and thereby practice a forcible entry through the door.

The Bishop and Allen devices are very useful training tools, and they certainly meet the goal of providing a reusable training tool. It is difficult, however, for the mechanisms used in these devices to provide the same "feel" as an actual door which is being forced open. In the case of the Bishop device, the sliding-box mechanism is biased against the strike plate and thereby provides some resistance to the prying action of the Halligan, but it is difficult for the resistance of the spring accurately to simulate the resistance of a door that is being broken or deformed. In the case of the Allen device, the friction against the deadbolt likewise provides resistance to the prying action of the Halligan, but this also fails to accurately simulate the resistance of a breaking or deforming door. It would therefore be desirable to provide an alternative device for more accurately simulating the resistance of a door that is being pried open with a tool such as a Halligan.

As noted above, prying open a door with a Halligan is only one of the techniques that may be used to gain forcible entry through a locked door. It would therefore be desirable to provide a device that allows firefighters to be trained to use these other techniques (e.g., cutting latches, locks, drop-bar bolts and hinges) in a way that is both realistic in application of the techniques and less expensive than destroying an actual door.

The present invention includes systems and methods for providing realistic simulation of forcible entry techniques using replaceable components that are designed to be deformed and/or destroyed during use. One embodiment includes a simulator having a door frame, a door pivotally mounted on the door frame, and at least one training station sub-unit that is mounted on either the door or the frame. The training station sub-unit includes at least one component that is designed to be destroyed and replaced (sometimes known as a "consumable" component). The consumable component is destroyed during use of the training station in order to produce a realistic training experience for the trainee using the station.

One embodiment of the invention comprises a forcible entry simulator that includes a door frame, a door, and a set of training station sub-units. Each of the training station sub-units includes one or more consumable components that are designed to be destroyed during a training evolution during which the training station is used. These components may include, for example door-edge inserts that are bent, latch pins that are bent or cut, bolts and door plates that are cut, and hinges that are cut. Additional components that are not necessarily destroyed during each training evolution but that may wear quickly enough to require periodic replacement may also be provided to maintain proper operation of the simulator without requiring that it be repaired.

It should be noted that "evolution", as used herein, refers to a single training exercise, such as prying open an inward-swinging door with a Halligan. It should further be noted that references herein to training stations or to sub-units should both be construed as being directed to appropriate training station sub-units of the simulator.

Figure 2:
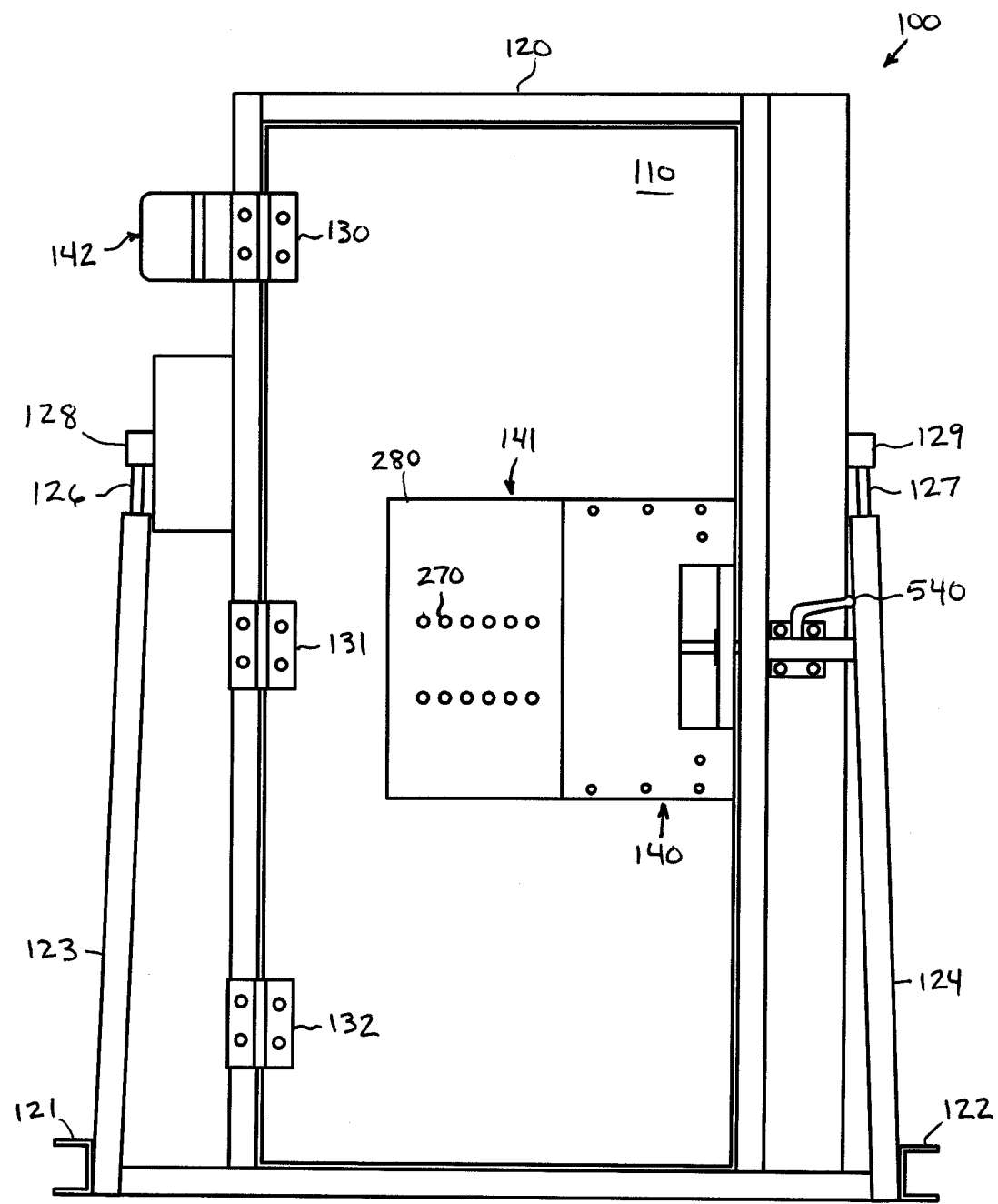
FIG. 2 is a diagram illustrating a plan view of the forcible entry simulator of FIG. 1.

Referring to FIGS. 1 and 2, an exemplary embodiment of the invention is shown. FIG. 1 is a perspective view of the simulator, while FIG. 2 is a plan view of the simulator from the front.

In this embodiment, simulator 100 comprises a door 110 that is mounted in a frame 120. In the left side of door 110 is connected to frame 120 by a set of hinges 130-132. Door 110 swings or pivots on the hinges as a conventional door. Simulator 100 includes several sub-units that include parts which are designed to be deformed, cut or otherwise destroyed in the normal course of a training evolution. This is quite different from prior art devices, which are designed to provide resistance to simulate forcible entry through a door, but are not intended to be damaged or replaced in each training evolution. The training sub-units in this embodiment include a door-edge sub-unit 140, drop-bar bolt sub-unit 141 and hinge-cutting sub-unit 142. Not shown in the figure are a latch-cutting sub-unit and a padlock cutting/breaking sub-unit.

In this embodiment, frame 120 is designed to be portable and freestanding. The frame therefore includes two horizontal members 121, 122 that rest on the ground, and two bracing members 123, 124 that are connected between the horizontal members and a vertical portion (125) of the frame in order to hold the vertical portion upright. The upper ends of bracing members 123 and 124 are adjustably connected to vertical portion 125 of frame 120. The lengths of bracing members 123 and 124 can therefore be adjusted to ensure that the vertical portion of the frame is plumb. Although not shown in the figure, casters may be connected to the frame (e.g., at horizontal members 121 and 122) to allow the frame to be rolled from one position to another.

It should be noted that, although the exemplary embodiment of FIGS. 1 and 2 is designed to be freestanding and portable, alternative embodiments may be neither freestanding nor portable. For example, there are a number of firefighting training facilities that have buildings that are used as training structures. Doors having the training stations described herein may be incorporated into these buildings, in which case the frames for the doors will be integral to the buildings rather than being portable and freestanding. Forcible entry simulators using such door frames are considered to be within the scope of the invention.

As noted above, forcible entry simulator 100 includes several different training station sub-units. One of these is door-edge sub-unit 140. In door-edge sub-unit 140, a straight metal bar is positioned at the edge of the door to simulate the edge of a typical commercial metal door. A latch pin is placed through the metal bar to engage a strike plate in frame 120, just as the latch of a conventional door would engage a strike plate in a conventional door frame. When a tool such as a Halligan is positioned between the door edge and the frame and is then used to pry the door open, the metal bar and/or latch pin are bent away from the door frame, similar to the way the edge of the conventional door would be deformed after being pried open. The deformed (bent) metal bar and/or latch pin can then simply be replaced, so that the simulator is ready for another training evolution.

Figure 3:
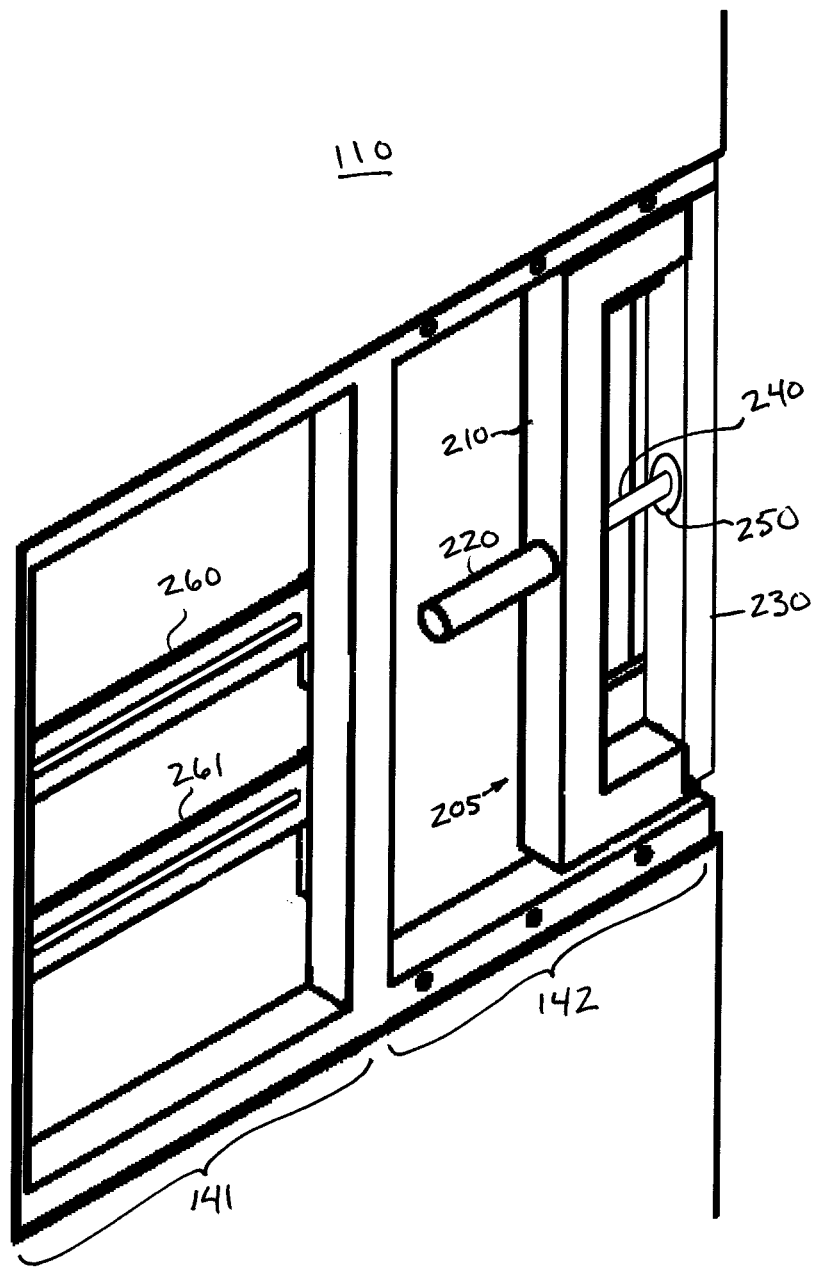
FIG. 3 is a diagram illustrating a perspective view of a door-edge sub-unit in accordance with one embodiment.
Figure 4:
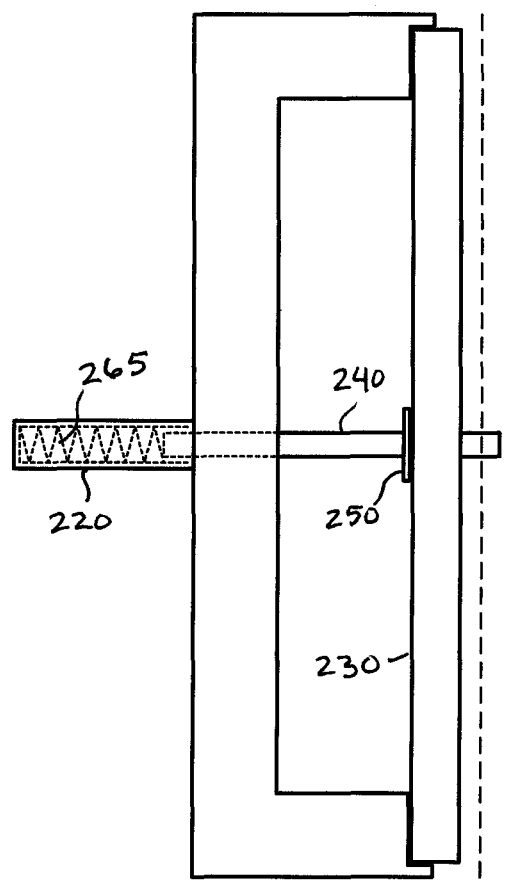
FIG. 4 is a diagram illustrating a plan view of the door-edge sub-unit of FIG. 3.

Referring to FIGS. 3 and 4, door-edge sub-unit 140 is shown in more detail. FIG. 3 is a perspective view of door-edge sub-unit 140 installed in door 110, while FIG. 4 is a plan view of door-edge sub-unit 140. The cover shown in FIGS. 1 and 2 has been removed in FIG. 3. Door-edge sub-unit 140 includes a receiver, a door-edge insert and a latch pin. The receiver 205 consists of a C-shaped component 210 and a tubular component 220. C-shaped component 210 has an aperture therethrough so that the latch pin can extend through it. Tubular component 220 is connected to C-shaped component 210 at the aperture so that the latch pin will extend into the tubular component. The tubular component is closed at one end (the left end in the figures). A spring 265 is placed in the tubular component so that when the latch pin is inserted through the C-shaped component and into the tubular component, the spring will bias the latch pin away from the receiver and toward the edge of the door and the door frame.

Receiver 205 is rigidly mounted to door 110 and is configured to receive door-edge insert 230. Door-edge insert 230 may, for example, be a piece of 1-inch by 1.5-inch rectangular tubular steel. Receiver 205 is positioned so that it holds door-edge insert 230 in a position that is in alignment with the edge of the door. This edge (the right edge in the figures) may be referred to herein as the latch-edge of the door because this is the edge of the door that latch is against the door frame. The opposite edge of the door, at which the door is connected by hinges to the frame, may be referred to as the hinge-edge of the door. Door-edge insert 230 has an aperture therethrough to accommodate latch pin 240. In this embodiment, latch pin 240 is made of ½-inch steel. It can be seen that latch pin 240 has a stop 250 that prevents the latch pin from going all the way through the aperture in the door edge insert. Thus, door-edge sub-unit 140 enables door 110 to latch shut in door frame 120, just as a conventional door does.

Figure 5:
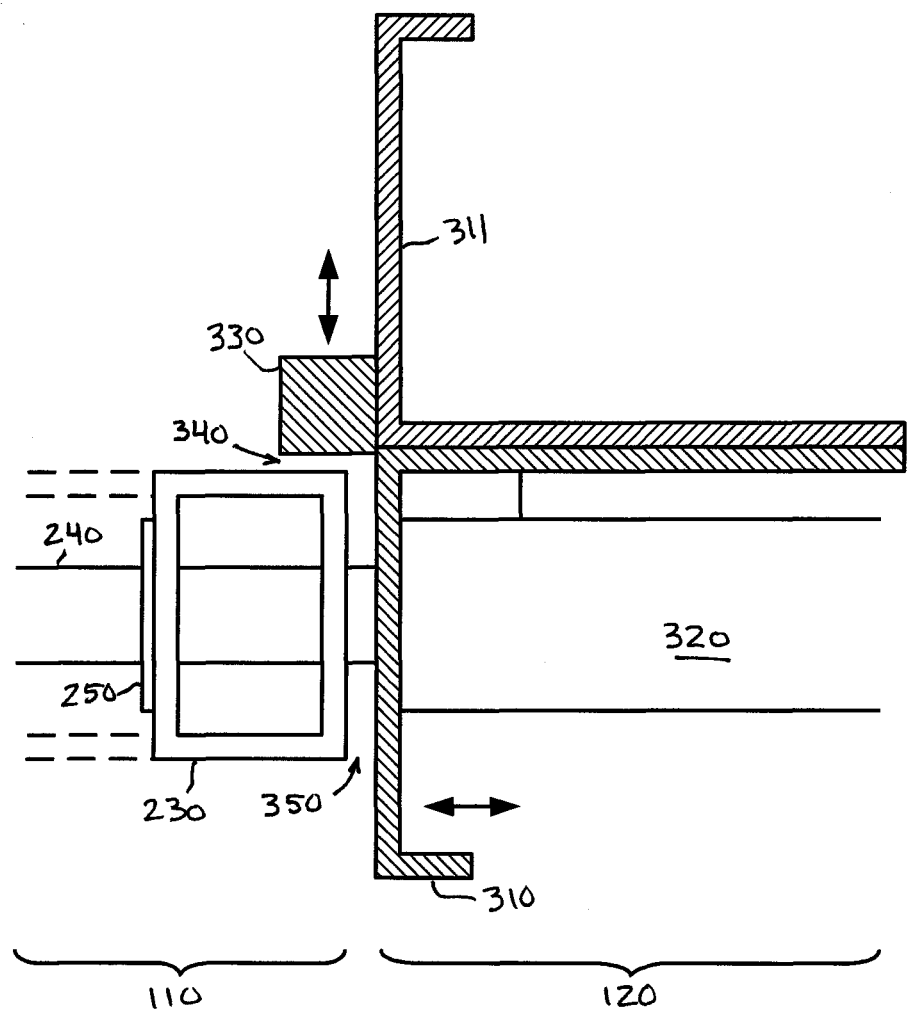
FIG. 5 is a diagram illustrating a cross-sectional view of the area around the latch-edge of the door in the embodiment of FIG. 1.
Figure 6A:
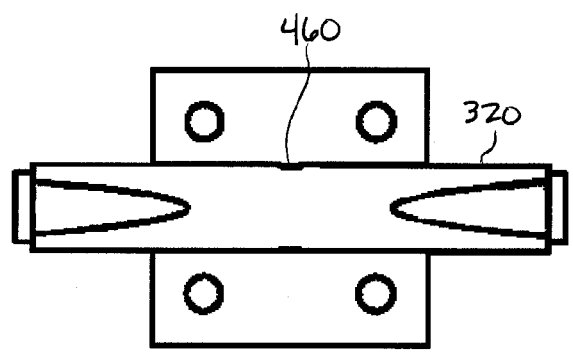
FIGS. 6A and 6B are diagrams illustrating plan and perspective views of a door jamb hole unit as used in the embodiment of FIG. 1.
Figure 6B:
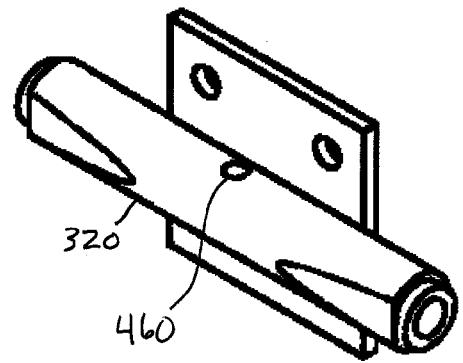

In one embodiment, the simulator can be adjusted to obtain desired gaps between the door and the door frame. Referring to FIG. 5, a cross-sectional view of the area around the latch-edge of the door is shown. The cross-section is taken just above the latch pin of the door. The figure shows the door edge insert 230 positioned in the receiver with latch pin 220 extending through the door edge insert. The frame includes upright frame portions 310 and 311. A door jamb hole unit 320 is formed by welding a steel tube onto a plate, which is then bolted to frame portion 310. The door jamb hole unit is shown in more detail in FIGS. 6A and 6B. The tube of door jamb hole 320 extends into a hole through frame portion 310 so that the frame will receive the latch pin and latch door 110 shut in frame 120. Because the edge of door jamb hole 320 may become worn, the unit is designed to be reversible—it can be unbolted, rotated 180 degrees, and bolted back onto the frame. Similarly, stop 330 (described below) may become worn as a result of repeated training evolutions, so it can in this embodiment be removed, rotated and reinstalled to present an unworn edge nearest the door.

Door frame 120 includes a stop 330 that prevents door 110 from swinging all of the way through door frame 120. When Door 110 is latched in door frame 120 (i.e., when latch pin 220 extends into door jamb hole unit 320), there may be a gap 340 between door 110 and stop 330. Stop 330 can be adjusted in or out in this embodiment (up or down in the figure) to adjust the size of gap 340. This allows firefighters to train for forcing open doors that have both larger gaps, where it is easier to force a Halligan between the door and the door stop, and smaller gaps, where it is more difficult to force a Halligan between the door and the door stop.

In this embodiment, door frame 120 can also be adjusted to increase or decrease the size of gap 350 between door 110 and door frame 120. Again, this allows training for doors that have both larger gaps in which it is easier to force a Halligan between the door and the door frame, and smaller gaps in which it is more difficult to force a Halligan between the door and the frame. It should be noted that the adjustment of gap 350 can be accomplished either by adjusting the position of upright frame portion 310, or by adjusting the position of door-edge sub-unit 140 within door 110.

Figure 7:
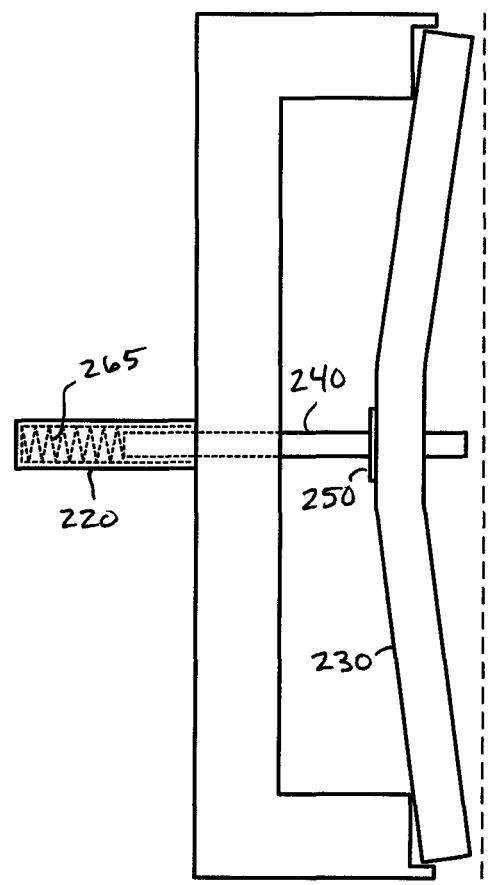
FIG. 7 is a diagram showing the manner in which a door-edge insert in one embodiment is deformed during a training evolution.

Referring to FIG. 7, a diagram showing the manner in which door-edge sub-unit 140 is used during a training evolution is illustrated. This figure is a plan view of door-edge sub-unit 140 after a training evolution. During the training evolution, a tool such as a Halligan is inserted between the door and the door frame at the position of the latch. More specifically, in the simulator, the Halligan is placed between the door edge insert and the frame. When the door is pried open, door edge insert 230 is bent away from the door frame, similar to the way a commercial door would be deformed if it were pried open. Latch pin 240 is thereby pulled away from the door frame so that the door can be swung open. Latch pin 240 may also be deformed during the training evolution. Door edge insert 230 and latch pin 240 do not spring back into shape, but are permanently deformed. In order to prepare the simulator for another training evolution, the deformed parts are simply replaced.

It should be noted that references herein to parts that are "permanently" deformed refers to the fact that the parts cannot be returned to their original shape without substantial effort. While it might be possible to return the parts to their original shapes and/or conditions, it is generally more cost-effective, and certainly faster, to simply replace the parts.

Because the simulator makes use of components that are deformed during a training evolution in a manner which is very similar to the deformation of an actual door during a forcible entry through the door, the resistance of the simulator is very similar to the resistance that is experienced during an actual forcible entry. The simulator thereby provides a training experience that may be more realistic than the experience that is provided by a simulator that uses spring-loaded components or friction to simulate the resistance of a locked door.

As noted above, the simulator may have training stations other than the door-edge sub-unit 140. For instance, the simulator may include a drop-bar bolt cutting training station. Referring again to FIGS. 1 and 2, drop-bar bolt cutting sub-unit 141 will be described in more detail. In drop-bar bolt cutting sub-unit 141, a set of bolts (e.g., 270) are positioned through a metal plate (280) in door 110 and secured. Referring to FIG. 3, drop-bar bolt cutting sub-unit 141 is shown with plate 280 removed. It can be seen that a pair of slotted bars 260 and 261 are mounted on door 110 opposite the plate. When the bolts are inserted through plate 280, they extend through the slots of bars 260 and 261. The bolts can be secured, for example, by screwing threaded nuts onto the portions of the bolts that extend through the slots. Once the bolts are secured, the drop-bar bolt cutting sub-unit is ready for a training evolution.

The number and positions of the bolts are comparable to the number and position of bolts that are typically used to secure a drop-bar bracket to a commercial metal door. During a training evolution using drop-bar bolt cutting sub-unit 141, a power saw is used to cut the heads off the bolts as would be required to remove a conventional drop-bar bracket. During the training evolution, the bolts are obviously destroyed. Metal plate 330 is also typically destroyed, because proper bolt-cutting technique involves cutting the bolts below the surface of the plate. Both the plate and the bolts can simply be replaced to prepare the simulator for the next evolution using this sub-unit.

Figure 8A:
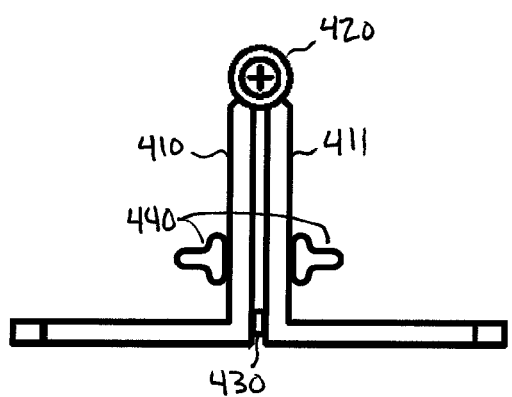
FIGS. 8A and 8B are diagrams illustrating plan and perspective views of a hinge-cutting sub-unit as used in the embodiment of FIG. 1.
Figure 8B:
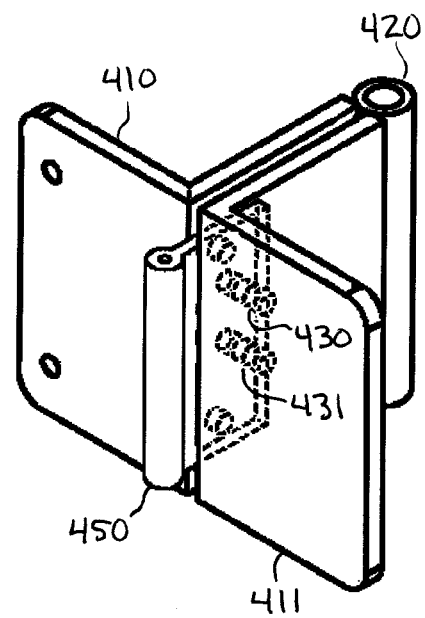

Hinge-cutting sub-unit 142 is positioned near upper hinge 130 in the embodiment of FIGS. 1 and 2. Hinge-cutting sub-unit 142 is shown in more detail in FIGS. 8A and 8B. In this embodiment, hinge-cutting sub-unit 142 consists of a pair of L-shaped plates (410, 411) that are pivotally connected to each other by hinge 420. Hinge-cutting sub-unit 142 is designed so that a commercial hinge 450 can be placed between L-shaped plates 410 and 411. A set of short mounting studs (430, 431) are provided on one of the plates to help secure the hinge. The holes of hinge 450 are positioned in alignment with studs 430 and 431 so that the studs hold hinge 450 in position in the same manner in which screws typically secure a hinge to a door and door frame. When plates 410 and 411 are closed over hinge 450, a clamp 440 is used to clamp the plates together, thereby securing hinge 450.

When hinge 450 is secured between the plates, a training evolution can be completed by using a power saw to cut the pivoting portion of the hinge from the portion of the hinge that is secured between plates 410 and 411. The portions of plates 410 and 411 that are parallel to the door protect the door and frame from being damaged by the saw. After the training evolution is complete, the destroyed hinge (450) can simply be removed from between the plates, and a new hinge can be secured between them to prepare the simulator for another evolution of this sub-unit.

Figure 9A:
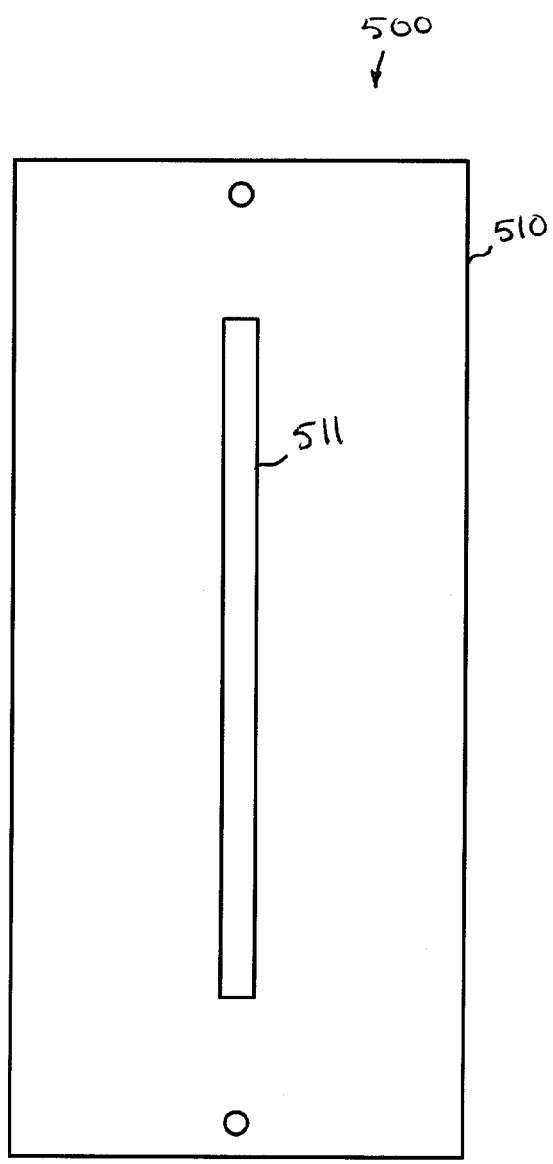
FIGS. 9A and 9B are diagrams illustrating plan and perspective views of a latch-cutting sub-unit as used in the embodiment of FIG. 1.
Figure 9B:
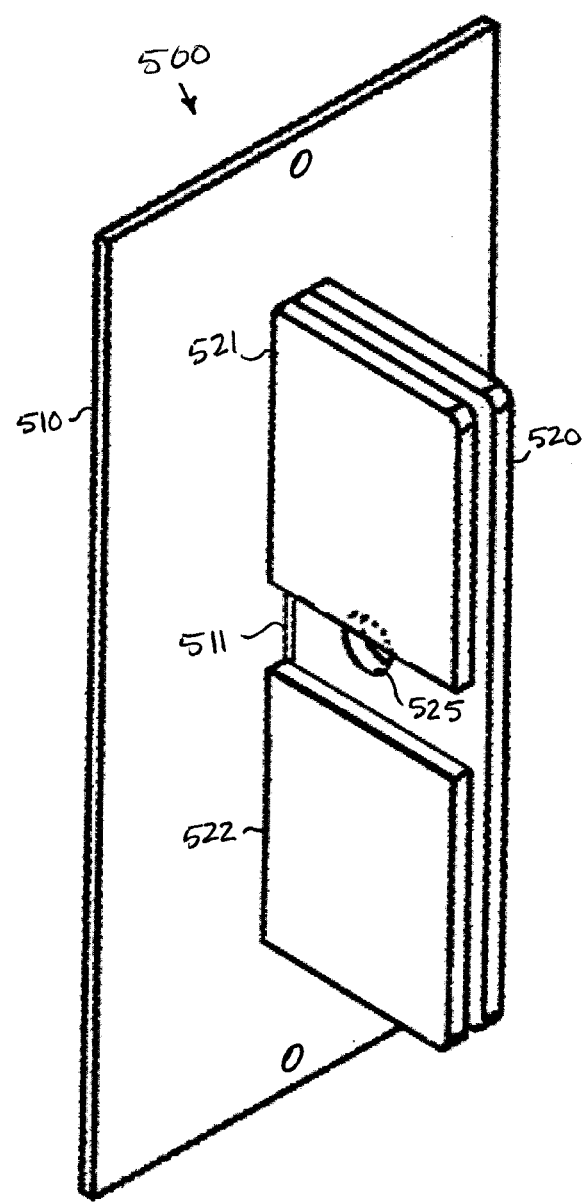

Another of the training stations that is provided in this embodiment is a latch-cutting station. This station makes the use of a latch-cutting sub-unit that is illustrated in FIGS. 9A and 9B. FIG. 9A is a plan view of the front of the latch-cutting sub-unit, while FIG. 9B is a perspective view of the rear of this sub-unit. Latch-cutting sub-unit 500 consists primarily of several plates. A front plate 510 is designed to be mounted over door-edge sub-unit 140 (see FIG. 1). Front plate 510 has a slot 511 therein. Rear plates 520-522 are affixed to the back of front plate 510 immediately adjacent to slot 511. When front plate 510 is mounted over door-edge sub-unit 140, rear plates 520-522 extends through the opening in door-edge sub-unit 140 at the edge of door 110. (It should be noted that door edge insert 230 is removed from door-edge sub-unit 140 prior to mounting latch-cutting sub-unit 500, and rear plates 520-522 are positioned roughly in the space that would be occupied by door edge insert 230.)

As shown in FIG. 9B, rear plate 520 has an aperture 525 therethrough. Aperture 525 is positioned so that, when latch-cutting sub-unit 500 is mounted on door 110, aperture 525 is aligned with door jamb hole 320. A steel rod is inserted through the tube of door jamb hole 320 and through aperture 525 of latch-cutting sub-unit 500 to simulate a deadbolt that would secure an actual door. A threaded hole 460 is provided in the top of the tube so that a locking screw (or set screw) can secure the steel rod in the tube after it is properly positioned. Door jamb hole 320 thereby serves as a clamp to hold the rod that simulates the deadbolt. As shown in FIG. 2, a handle 540 is provided on the locking screw to make it easier to lock the rod in position in the tube.

After latch-cutting sub-unit 500 is mounted on door 110 and a steel rod is locked in position in door jamb hole 320 (and through aperture 525), the unit is ready for a training evolution. In this evolution, a saw is used to cut through the steel rod in order to simulate cutting a deadbolt. The saw is inserted through slot 511 to cut the rod. Front plate 510 protects the front of door 110 and frame 120 from being damaged by the saw. Similarly, rear plates 520-522 protect door 110 and frame 120 from damage. Once the trainee has sawn through the steel rod, the door (with latch-cutting sub-unit 500 attached) can be opened. It should be noted that the gap between rear plates 521 and 522 is provided to allow the latch-cutting sub-unit to move outward with the door. The steel rod is cut between the rear plates, so the portion of the steel rod which is locked into the door jamb hole still extends as far as rear plates 521 and 522—if a single plate with an aperture similar to plate 520 were used, the portion of the steel rod locked into the door jamb hole would still extend through this aperture and would keep the simulator door from opening.

Figure 10:
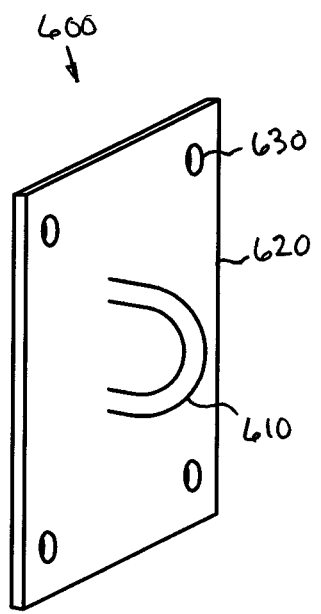
FIG. 10 is a diagram illustrating one embodiment of a padlock cutting/breaking sub-unit.
Figure 11:
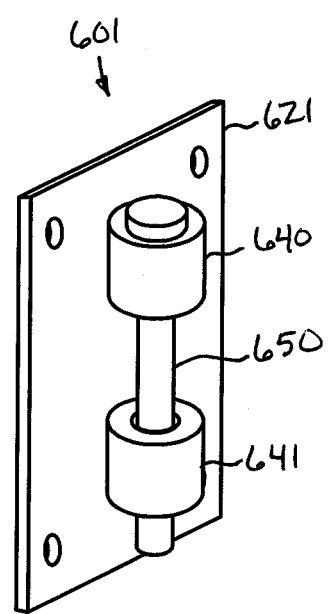
FIG. 11 is a diagram illustrating an alternative embodiment of a padlock cutting/breaking sub-unit.

Another of the training stations that is provided in this embodiment is a padlock cutting/breaking station. Referring to FIGS. 10 and 11, two different embodiments of a padlock cutting/breaking station are illustrated. FIG. 10 shows an embodiment of the padlock cutting/breaking station that uses a simple steel loop 610 that is welded on to a plate 620. Plate 620 has a set of holes (e.g., 630) that allow the plate to be bolted to door frame 120. A padlock can be opened, the shackle placed through loop 610, and then locked. In a training evolution using this training station, the forked end of a Halligan can be placed over the shackle of the padlock, and then the Halligan can be rotated with respect to loop 610 to break the shackle.

One of the problems with padlock cutting/breaking station 600 as illustrated in FIG. 10 is that, in order to use this training station, it is necessary to be able to unlock the padlock. While this is not a problem for new padlocks, it can be expensive to have to purchase padlocks simply for the purpose of cutting or breaking them during training. It is much less expensive to conduct this training when donated padlocks can be used, but donated padlocks do not always have keys, and for combination padlocks, the combination is not always known. It would therefore be desirable to provide a padlock cutting/breaking station that can make use of donated padlocks that cannot be unlocked (i.e., for which there is no key, or for which the combination is unknown).

Referring to FIG. 11, an alternative embodiment 601 of a padlock cutting/breaking station is shown. In this embodiment, two pieces of tubular steel (640 and 641) are welded to plate 621. A steel pin 650 can be placed through tubes 640 and 641 to provide an attachment point for a padlock. If the padlock cannot be unlocked, pin 650 can be removed (or simply raised), the shackle of the padlock can be inserted between loops 640 and 641, and pin 650 can be replaced. A training evolution using padlock cutting/breaking station 601 can then proceed in the same manner as a training evolution using the embodiment of FIG. 10.

The embodiment of the forcible entry training simulator described above is exemplary, and alternative embodiments of the invention may vary. For example, while the embodiment described above includes multiple training station sub-units, another embodiment may include only a subset of the described training station sub-units, or even a single one of the training station sub-units. For instance, one embodiment may include only a door edge sub-unit similar to the one described in connection with FIGS. 3, 4 and 7. Another embodiment may include only the hinge-cutting sub-unit or the drop-bar bolt cutting sub-unit. Still other embodiments may include other individual training station sub-units or different combinations of the sub-units.

It should also be noted that, while the foregoing embodiments use steel for various components, such as the door edge insert, other materials may also be suitable. Alternative embodiments may therefore use other types of metal, or even non-metal materials that are appropriate for the various components of the invention. Also, while several specific types of training stations are described above, alternative embodiments may utilize training stations other than the ones specifically described. The alternative training stations may comprise minor variations on the described sub-units, or they may depart substantially from those sub-units.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A forcible entry training device comprising:
   a door frame;
   a door, wherein a hinge-edge of the door is pivotally connected to the door frame;
   a door edge insert receiver mounted in the door adjacent to a latch-edge of the door opposite the hinge-edge; and
   a door edge insert mounted in the door edge insert receiver, wherein the door edge insert forms a portion of the latch-edge of the door;
   wherein the door edge insert receiver supports an upper portion of the door edge insert and a lower portion of the door edge insert and leaves a central portion of the door edge insert unsupported, thereby enabling the central portion of the door edge insert to bend inward toward the door without deforming the door edge insert receiver;
   wherein the door edge insert is permanently deformed when the door is pried open at the latch-edge during a training evolution; and
   wherein the deformed door edge insert is removable from the door edge insert receiver and replaceable with a non-deformed door edge insert.

2. The forcible entry training device of claim 1, wherein the forcible entry training station comprises:
   a latch pin;
   wherein the door edge insert receiver is configured to be mounted proximal to an edge of a door;
   wherein the door edge insert receiver is a C-shaped member configured to hold the door edge insert in position at an edge of the door, wherein an upper end of the C-shaped member contacts an upper end of the door edge insert and prevents the upper end of the door edge insert from moving inward toward a center of the door, wherein a lower end of the C-shaped member contacts a lower end of the door edge insert and prevents the lower end of the door edge insert from moving inward toward the center of the door, and wherein a central portion of the door edge insert is unsupported by the C-shaped member and is allowed to deform inward toward the center of the door;
   wherein the door edge insert has an aperture there through to accommodate the latch pin; and
   wherein the door edge insert receiver is configured to hold the latch pin in position within the aperture and to bias the latch pin toward the edge of the door.

3. The forcible entry training device of claim 2, wherein when the door is forcibly pried open at the latch-edge, the door edge insert is permanently deformed, and wherein the deformed door edge insert is replaceable with a non-deformed door edge insert.

4. The forcible entry training device of claim 1, wherein the forcible entry training station comprises a drop-bar bolt cutting sub-unit, wherein the drop-bar bolt cutting sub-unit includes a front plate configured to be mounted on the front of the door and a plurality of bolts that are secured through the plate.

5. The forcible entry training device of claim 1, wherein the forcible entry training station comprises a hinge cutting sub-unit, wherein the hinge cutting sub-unit comprises first and second plates and a clamp, wherein when a consumable hinge is positioned between the first and second plates, the clamp holds the first and second plates against the consumable hinge, thereby securing the consumable hinge in position between the first and second plates.

6. The forcible entry training device of claim 5, wherein each of the first and second plates is L-shaped, wherein the first and second plates are pivotally connected to each other by a sub-unit hinge, wherein at least one of the first and second plates includes one or more mounting studs positioned to extend into corresponding mounting holes in the consumable hinge.

7. The forcible entry training device of claim 1, wherein the forcible entry training station comprises a latch cutting station sub-unit, wherein the latch cutting station sub-unit includes a clamp configured to hold a metal rod in a deadbolt position between the door and the door frame.

8. The forcible entry training device of claim 7, wherein the latch cutting station sub-unit further comprises a front plate that is mounted on the door in alignment with the front of the door, wherein the front plate has a slot there through at a latch edge of the door opposite the hinge edge to enable access to the metal rod by a saw blade, wherein the latch cutting station sub-unit further comprises one or more rear plates connected to the front plate and extending perpendicular to the front plate between the door and the door frame, wherein the one or more rear plates are configured to accommodate the metal rod there through.

9. The forcible entry training device of claim 1, wherein the forcible entry training station comprises a padlock cutting/breaking sub-unit, wherein the padlock cutting/breaking sub-unit includes a metal loop configured to accept a padlock shackle there through, wherein the metal loop is secured to one of the door and the door frame.

10. The forcible entry training device of claim 1, wherein the forcible entry training station comprises a padlock cutting/breaking sub-unit, wherein the padlock cutting/breaking sub-unit includes a removable metal pin configured to pass through a padlock's shackle and to thereby secure the padlock to the padlock cutting/breaking sub-unit.

11. The forcible entry training device of claim 1, wherein the forcible entry training station comprises a plurality of forcible entry training stations.

12. The forcible entry training device of claim 11, wherein the forcible entry training stations include: a door edge insert sub-unit; a drop-bar bolt cutting sub-unit; a hinge cutting sub-unit; a latch cutting station sub-unit; and a padlock cutting/breaking sub-unit.

13. The forcible entry training device of claim 1, wherein the door frame is freestanding and portable.

14. The forcible entry training device of claim 1, wherein at least one of the door and the door frame is adjustable to modify a gap between the door and the door frame when the door is in a closed and latched position in the door frame.

15. The forcible entry training device of claim 14, wherein the door frame includes a door stop that is adjustable to modify a gap between the door and the door stop when the door is in a closed and latched position in the door frame.

16. The forcible entry training device of claim 1, wherein the door frame includes a door stop that is reversible to alternately position either a first edge or a second edge opposite the first edge toward the door.

17. The forcible entry training device of claim 1, wherein the door frame includes a door jamb hole tube that is reversible to alternately position either a first end or a second end opposite the first end toward the door.

18. A forcible entry training device comprising:
   a door edge insert receiver;
   a door edge insert; and
   a latch pin;
   wherein the door edge insert receiver is configured to be mounted adjacent to a latch-edge of a door;

wherein the door edge insert receiver is configured to hold the door edge insert in position at the latch-edge of the door;

wherein the door edge insert receiver supports an upper portion of the door edge insert and a lower portion of the door edge insert and leaves a central portion of the door edge insert unsupported, thereby enabling the central portion of the door edge insert to bend inward toward the door edge insert receiver without deforming the door edge insert receiver when the door is pried open at the latch-edge during a training evolution;

wherein the deformed door edge insert is removable from the door edge insert receiver and replaceable with a non-deformed door edge insert;

wherein the door edge insert has an aperture there through to accommodate the latch pin; and wherein the door edge insert receiver is configured to hold the latch pin in position within the aperture and to bias the latch pin toward the edge of the door.

* * * * *